United States Patent Office

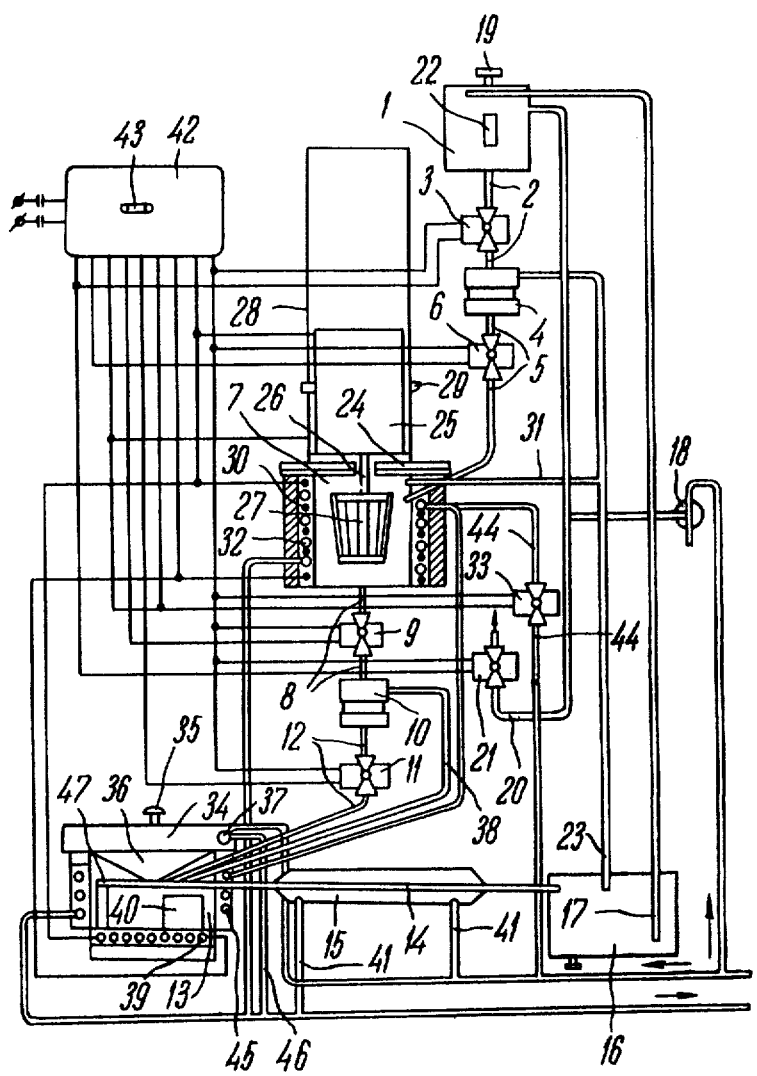

3,669,629
Patented June 13, 1972

---

3,669,629
APPARATUS FOR DETERMINING FAT
CONCENTRATION IN MATERIALS
Nikolai Parfentievich Paramonov, Ulitsa Marupes 2,
kv. 3, Jurmala, U.S.S.R.
Filed Apr. 27, 1970, Ser. No. 32,035
Int. Cl. G01n 33/26
U.S. Cl. 23—259                                  3 Claims

ABSTRACT OF THE DISCLOSURE

The present invention relates to apparatuses for determining fat concentration in materials.

The apparatus comprises an extractor which is fitted with a vibrator to impart vibrations to solvent and material under test contained therein and is connected to solvent-measuring and solution-measuring hoppers at its inlet and outlet, respectively, through controlled valves; and an evaporator with a built-in condenser to separate fat from solvent and condense solvent vapour.

---

The present invention relates to apparatuses for determining the concentration of fat in different materials, particularly in wool fibre, yarn, and fabric.

Known in the art are various apparatuses for determining fat concentration in different materials.

One of them comprises a condenser in which condensation of solvent vapour takes place and which is connected to an extractor containing the material under test and the solvent. Also connected to the extractor is an evaporator serving to separate fat from the solvent. The condenser communicates with the extractor.

The analysis in these apparatuses is carried out as follows. The solvent, on being vapourized in the evaporator, flows by way of a tube through the top of the extractor and enters the condenser where the condensation takes place. The liquefied solvent drips down the extractor and drops on a sample of the material under test.

The fat contained in the material dissolves in the condensate and the solvent returns back into the evaporator through a siphon.

The distillation cycle is repeated ten times to obtain complete extraction of fat from the material under test, which makes the operation time-consuming and renders the known apparatus unsuitable for industrial application as a means of process control.

The known apparatuses for determining fat concentration are not air-tight and represent a fire and explosion hazard, unless constantly attended to, for the solvents used in them are low-boiling and highly inflammable substances.

An object of the present invention is to provide an apparatus for determining fat concentration in materials, capable of performing the analysis within a short period of time.

Another object of the present invention is to provide a closed-loop apparatus with continuous circulation of the solvent and solution.

Still another object of the present invention is to provide an apparatus which enables the use of non-inflammable solvents with a high boiling point, such as trichlormethane, methylene chloride and the like.

The present invention resides in an apparatus for determining fat concentration in materials, which comprises a condenser to condensate solvent vapours, an extractor containing solvent and the material under test and connecting to said condenser, and an evaporator separating fat from solvent and connecting to the extractor. The characteristic features of the apparatus disclosed herein are the presence of a vibrator placed on the extractor cover and designed to impart vibrations to the solvent and the material sample and of controlled valves by means of which the extractor may be connected to solution-measuring and solvent-measuring hoppers arranged, respectively, at its inlet and outlet, and the presence of a condenser built into the evaporator to separate fat from solvent and to condense solvent vapour, the condenser communicating with the extractor through the solution-measuring hopper.

In the preferred embodiment of the present invention, the evaporator also communicates with a solvent-collecting vessel in which vacuum is maintained by means of a vacuum pump connected to a receiving vessel by a tube through which solvent is returned from the collecting vessel back into the receiving vessel.

In the present apparatus, the evaporator is an air-tight chamber equipped with an electric heater and a coil for a cooling liquid to circulate. The cover of said chamber is fitted with a cone-shaped jacket through which a cooling liquid may circulate so that said cover serves as a condenser of solvent vapours.

The vibrator incorporated into the present apparatus imparts vibration to the solvent and material under test, speeding up the process of extracting fat from said material.

Air-tightness of the apparatus precludes the possibility of contaminating the material and ensures high accuracy of the analyses. The apparatus is also fully explosion-proof because the enclosed heaters incorporated into it allow the use of non-inflammable solvents with a high boiling point.

The invention will be best understood from the following detailed description of a preferred embodiment of the present invention when read in conjunction with the accompanying drawing which is a schematic diagram of the apparatus for determining fat concentration in various materials.

Referring to the drawing, the apparatus comprises a solvent-receiving vessel 1 connected by means of tubes 2 and a solenoid-actuated valve 3 with a solvent-measuring hopper 4 which, in its turn, is connected to an extractor 7 through tubes 5 and a solenoid-actuated valve 6.

A tube 8 and a solenoid-actuated valve 9 put the extractor 7 in communication with a solution-measuring hopper 10 which is fitted with a solenoid-actuated valve 11 for controlling the flow of solution into an evaporator 13 through tubes 12. The evaporator 13 is connected to a solvent-collecting vessel 16 into which the used solvent flows via tubes 14 and a cooler 15 from the evaporator.

From the collecting vessel 16 the solvent returns back into the receiving vessel 1 through a tube 17 due to a vacuum maintained in the system by means of a vacuum pump 18.

The receiving vessel 1 has a connection 19 with a threaded plug (not shown) and a packing for filling the apparatus with solvent and a tube 20 for withdrawing the air from the system when a solenoid-actuated valve 21 is closed. Also provided in the vessel 1 is a viewing port 22.

The solvent-measuring hopper 4 comprises a metal vessel of cylindrical shape made up of two halves interconnected by means of a thread. A fluorine-based plastic gasket is interposed between the halves.

The hopper has an overflow tube 23 for returning surplus solvent back into the collecting vessel 16. The drain tube 5 with the solenoid-actuated valve 6 is provided in the bottom of the solvent-measuring hopper.

The extractor 7 is a metal vessel of cylindrical or conic shape. It has an air-tight cover 24 which accommodates a vibrator 25 linked by means of a rod 26 to a removable bucket 27 containing a sample of the material under test.

The cover 24 may slide up and down along a guide 28 integrally with the vibrator 25 and can be locked in any position by means of stops 29.

The extractor 7 is fitted with an electric heater 30 by means of which the solvent left over in the sample of material after the extraction is removed into the collecting vessel 16 via a tube 31.

The extractor 7 is also provided with a cooling coil 32 and a solenoid-actuated valve 33 which admits water into the coil. To ensure air-tightness, an annular seal is provided between the extractor shell and the cover.

The solution-measuring hopper 10 forms a part of the solvent-measuring hopper 10 and is of the same layout as this latter hopper. The solenoid-actuated valve 11 controls the flow of solution from the hopper 10 into the evaporator 13.

The evaporator 13 serving to separate fat from solvent is an air-tight chamber with a hinged cover 34 closed by means of a rotatable handle with a detent 35. A cone-shaped water jacket 36 which serves to condense the solvent vapour is fitted under the cover and provided with two tube connections 37 for water circulation. Entering the evaporation chamber are the connection tube 12 for passing the solution from the measuring hopper 10 and an overflow tube 38 for draining the surplus solution from the hopper 10. The evaporator 13 is also fitted with an electric heater 39 for removing the solvent. Graduated beakers 40 and 40a (the latter not shown) are placed under the tubes 12 and 38 inside the evaporator.

The cooler 15 consists of an inner tube surrounded by a jacket with two side tubes 41 for feeding the cooling water into the jacket. The connection tube 14 discharges the condensate into the collecting vessel 16.

The solenoid-actuated valves used in the apparatus are all of the same design but differ in through-put capacity.

All operations are automatically controlled by means of a control unit 42 which is triggered by a toggle switch 43.

The apparatus for determining fat concentration may operate with four extractors without adding any other vessel to the system.

For rapid determination of fat concentration the apparatus relies on the extraction of fat by solvent under the conditions of vibration set up in the sample and solvent followed by the separation of the fat solute from the rest of the solution obtained during the analysis. The fat concentration is determined by separating the fat from said fat solute during the process of evaporating the solvent and by drying the fatty substance in the apparatus.

The procedure of performing an analysis is a follows.

The solvent-receiving vessel 1 is filled with solvent through the connection 19 in an amount which brings the solvent level up to the top of the viewing port 22.

A 3.5 to 5 g. sample of the material under test, weighed accurately to 0.01 g., is placed into the latticed cone-shaped bucket 27. The bucket is attached to the rod 26 of the vivbrator 25, the cover 24 is lowered onto the shell of the extractor 7 and is locked in the position and the toggle switch 43 of the control unit 42 is set on. The ejector-type vacuum pump 18 is set into operation for the entire period of the fat concentration determination which is accomplished automatically in several cycles as follows.

Cycle I: On setting the toggle switch 43 on, the solenoid-actuated valve 3 opens, admitting solvent into the measuring hopper 4, and the solenoid-actuated valve 21 connects the system to the atmosphere. The solvent from the receiving vessel 1 passes to the measuring hopper 4.

Cycle II: As soon as the measuring hopper 4 is full, the surplus solvent drains via the tube 23 into the receiving vessel 16 and the solenoid-actuated valve 6 opens. The solvent from the measuring hopper 4 flows into the extractor 7 through the tubes 5.

Cycle III: As soon as the extractor 7 is filled with the solvent, the electrically-actuated vibrator 25 is set into operation. Under the action of vibrations there takes place the process of extracting fat from the material under test. At the same time, the solenoid-actuated valve 33 admits the cooling water into the coils 32 of the extractor 7 through the tubes 44 and into the coil 45 of the evaporator 13 via the tube 46. At the end of the cycle, the solenoid-actuated valve 21 disconnects the system from the atmosphere.

Cycle IV: When the process of extraction is completed, the solenoid-actuated valve 9 opens, allowing the solution contained in the extractor 7 to flow via the tubes 8 into the measuring hopper 10. Since the capacity of the measuring hopper 10 is only ⅓ of that of the extractor 7, the surplus solution from the extractor flows via the measuring hopper 10 and the overflow tube 38 into the non-graduated beaker 40a (not shown) which has been placed into the evaporator 13 in advance.

Simultaneously with the opening of the solenoid-actuated valve 9, the solenoid-actuated valve 33 closes, interrupting the flow of the cooling water.

Cycle V: On filling the measuring hopper 10, the solenoid-actuated valve 11 admits a measured amount of the solution from the measuring hopper into the graduated beaker 40 for the analysis.

Cycle VI: As soon as the flow of solution into the beakers 40 and 40a is stopped, the electric heaters 30 and 39 are cut in, heating up the extractor 7 and evaporator 13, respectively. As a result, the solvent left over in the material under test evaporates, leaves the extractor 7 and drips into the collecting vessel 16 through the tube 23, having condensed underway. Also the solvent contained in the beakers 40 and 40a evaporates, condenses upon the contact with the cone-shaped condenser 36, drips into a chute 47, and passes into the collecting vessel 16 via the tube 14.

The solvent accumulated in the collecting vessel 16 returns back into the receiving vessel 1, flowing through the tube 17 due to the vacuum maintained in the system by the vacuum pump 18.

Cycle VII: On evaporating the solvent contained in the extractor 7 and evaporator 13, the solenoid-actuated valve 33 admits water from the mains into the cooling coils 32 and 45 of the extractor 7 and evaporator 13, respectively, to cool them down.

Cycle VIII: As soon as the extractor 7 and evaporator 13 have cooled down, the control unit 42 cuts the apparatus out.

The beaker 40 is removed from the evaporator and weighed accurately to 0.0004 g., using an analytical balance. The fat concentration in percent is computed from $$A = \frac{V_1 g}{V_1 M} 100$$

where $V_1$ = cubic capacity of solvent-measuring hopper, cm.³;
$V_2$ = cubic capacity of solution-measuring hopper, cm.³;
$g$ = weight of fat, g.;
$M$ = weight of sample, g.;
$A$ = fat concentration, percent.

What is claimed is:

1. An apparatus for determining fat concentration in various materials which includes a solvent-receiving vessel, a first automatically controlled valve for discharging the solvent from said solvent-receiving vessel, a solvent-measuring hopper communicating with said solvent-receiving vessel through said first controlled valve, a second automatically controlled valve for discharging the solvent from said solvent-measuring hopper, an extractor having an air-tight cover located at the outlet from said solvent-measuring hopper, communicating with said hopper through the second controlled valve, a sample bucket in said extractor containing the solvent and the material under test, a vibrator arranged on the cover of said extractor and linked to said bucket by means of a rod, a third automatically controlled valve for discharging solution from said extractor, a solution-measuring hopper communicating with said extractor through the third controlled valve, a fourth automatically controlled valve for discharging solution from said solution-measuring hopper, an air-tight evaporator for separating fat from the solvent, graduated beakers in said evaporator for receiving and measuring said separated solution, said evaporator being located at the outlet from said solution-measuring hopper and communicating with it through the fourth controlled valve.

2. An apparatus for determining fat concentration in various materials which includes a solvent-receiving vessel, a first automatically controlled valve for discharging solvent from said solvent-receiving vessel, a solvent-measuring hopper communicating with said solvent receiving vessel through the first controlled valve, a second automatically controlled valve for discharging the solvent from said solvent-measuring hopper, an extractor having an air-tight cover located at the outlet from said solvent-measuring hopper, communicating with said hopper through the second controlled valve, a sample bucket in said extractor containing the solvent and the material under test, a vibrator arranged on the cover of said extractor and linked to said bucket by means of a rod, a third automatically controlled valve for discharging solution from said extractor; a solution-measuring hopper communicating with said extractor through the third controlled valve, a fourth automatically controlled valve for discharging solution from said solution-measuring hopper, an air-tight evaporator for separating fat from the solvent, which is located at the outlet from said solution-measuring hopper and is in communication with it through the fourth controlled valve, graduate beakers in said evaporator for receiving and measuring said separated solution, a solvent-collecting vessel communicating with said evaporator, and a vacuum pump connected to said solvent-receiving vessel and communicating with said solvent-collecting vessel so as to enable solvent to return from said solvent-collecting vessel back into said solvent-receiving vessel.

3. An apparatus as claimed in claim 1, in which the evaporator is an air-tight chamber equipped with an electric heater and a coil for a cooling liquid to circulate and in which the cover of said chamber is mounted on a conically-shaped jacket through which a cooling liquid may circulate so that said cover serves as a condenser of solvent vapour.

References Cited
UNITED STATES PATENTS

| | | | |
|---|---|---|---|
| 2,192,614 | 3/1940 | Mackenzie | 23—253 X |
| 2,732,415 | 1/1956 | Klinge | 23—272.6 SX |
| 3,403,980 | 10/1968 | Litterio | 23—259 X |
| 3,565,587 | 2/1971 | Graf, Jr. | 23—270 X |

JOSEPH SCOVRONEK, Primary Examiner

U.S. Cl. X.R.

23—253 R, 267 C, 272.6 S, 312 A; 202—169